Patented May 27, 1941

2,243,404

UNITED STATES PATENT OFFICE 2,243,404

CATALYST PREPARATION

Alexis Voorhies, Jr., Baton Rouge, La., assignor to Standard Oil Development Company, a corporation of Delaware No Drawing. Application June 17, 1939, Serial No. 279,681

2 Claims. (Cl. 252—259)

This invention relates to the preparation of catalysts and pertains more particularly to a method of improving the mechanical strength of catalyst units.

In many types of catalytic reactions employing solid catalysts, the catalyst can be employed to better advantage by molding it or forming it into units of uniform size. This may be accomplished by any suitable forming operation such as by extrusion, molding or pilling. In many cases however, the catalyst is not sufficiently cohesive to retain its shape under service conditions without the addition of a binding or reinforcing agent. In such cases it is imperative that the binding or reinforcing agent be of such nature as not to adversely effect the activity of the catalyst. For example, while sodium silicate is generally recognized as an excellent binding agent in molding operations, it cannot be employed in cases where the sodium impairs the efficiency of the catalyst. Such a binding agent cannot be employed successfully for example, in cases where the catalysts are subjected to relatively high temperatures of the order of 1000° F. or more.

The object of the present invention is to provide formed catalyst units having a high mechanical strength and which may be employed at high temperatures.

A further object of the invention is to provide an improved binding agent for forming catalyst units which will not interfere with the activity of the catalyst even at high temperatures.

While the present invention in its broader phases may have a more general application it is particularly adapted to cases wherein the catalyst is employed in the high temperature treatment of hydrocarbon oils such as in catalytic cracking, hydrogenation, dehydrogenation, reforming or the like.

In accordance with the present invention I employ as a binding agent for such catalysts a solution containing a silicic acid ester such as ethyl silicate. The solution of silicic acid ester may be added before or after forming or molding the catalyst.

The effectiveness of such material for improving the mechanical strength of the catalyst units is shown by the following example.

Example

A catalyst for dehydrogenation of hydrocarbon oils comprising 4% chromium oxide and 96% activated alumina prepared by impregnating activated alumina with chromium nitrate solution and then drying and decomposing was formed into $3/8''$ diameter pills. A portion of the pills so formed was soaked in an alcoholic solution of ethyl silicate and then dried at 200° F. The treated and untreated pills were tested for compressive strength and erosion properties. For comparative purposes the untreated pills were subjected to the same heat treatment as the treated pills. The erosion tests were determined by tumbling a definite quantity of pills in a fall mill for 30 minutes. The results of the tests are tabulated below:

| Treat | Heat | Compressive strength | | Tumbling test |
|---|---|---|---|---|
| | | #1 side | #1 sq. in. | Powder produced |
| | °F. | | | Percent |
| None | None | 8 | 550 | (2 |
| Do | 200 | 8 | 780 | 45 |
| Do | 1000 | 10 | 800 | 46 |
| Ethyl silicate | None | | | |
| Do | 200 | 9 | 600 | 33 |
| Do | 1000 | 12 | 1130 | 8 |

It will be noted that at elevated temperatures of the order of 1000° F. the compressive strength of the catalyst increased from 800 to 1130 per square inch, an increase of over 40% and that only 8% powder was formed in the tumbling test as compared with 46%.

Having described the specific embodiment of the invention it will be understood that it embraces other variations and modifications as come within the spirit and scope thereof.

I claim:

1. A method of improving the mechanical strength of formed catalyst units which comprises impregnating the same with a solution of a silicic acid ester and thereafter decomposing the ester.

2. A method of improving the mechanical strength of formed catalyst units which comprises treating said unit with a solution containing ethyl silicate and thereafter drying the product.

ALEXIS VOORHIES, Jr.